US005419922A

United States Patent [19]

Bajek

[11] Patent Number: 5,419,922

[45] Date of Patent: May 30, 1995

[54] METHOD AND APPARATUS FOR REPAIRING THE REFRACTORY LINING OF A REFRACTORY VESSEL

[75] Inventor: Robert A. Bajek, Sewickley, Pa.

[73] Assignee: BMI, Inc., Carnegie, Pa.

[21] Appl. No.: 213,032

[22] Filed: Mar. 15, 1994

[51] Int. Cl.[6] .................. B32B 35/00

[52] U.S. Cl. .................. 427/140; 427/236; 427/427; 118/317

[58] Field of Search .................. 427/236, 427, 140; 118/317

[56] References Cited

U.S. PATENT DOCUMENTS

| | | | |
|---|---|---|---|
| 1,928,621 | 10/1933 | Frede et al. | 141/1 |
| 2,082,330 | 6/1937 | Frede et al. | 299/57 |
| 3,351,289 | 11/1967 | Demaison | 239/132.3 |
| 3,797,745 | 3/1974 | Haus | 239/227 |
| 3,799,445 | 3/1974 | Marino | 239/242 |
| 3,902,670 | 9/1975 | Koller et al. | 239/227 |
| 3,957,203 | 5/1976 | Bullard | 239/128 |
| 3,973,730 | 8/1976 | Johnson | 239/186 |
| 4,085,894 | 4/1978 | Kubo et al. | 239/121 |
| 4,099,708 | 7/1978 | Morris et al. | 266/281 |
| 4,163,546 | 8/1979 | Morris et al. | 266/281 |
| 4,167,246 | 9/1979 | Haus | 239/227 |
| 4,181,258 | 1/1980 | Ogawa | 239/186 |
| 4,211,367 | 7/1980 | Allison | 239/226 |
| 4,251,063 | 2/1981 | Goldberg et al. | 266/281 |
| 4,301,998 | 11/1981 | Rodway | 266/281 |
| 4,337,897 | 7/1982 | Höffken et al. | 239/214.25 |
| 4,421,275 | 12/1983 | Gratton | 239/226 |
| 4,494,737 | 1/1985 | Rymarchyk, Jr. et al. | 266/281 |
| 4,649,858 | 3/1987 | Sakai et al. | 118/697 |
| 4,690,327 | 9/1987 | Takai et al. | 239/226 |
| 4,779,798 | 10/1988 | Natolino et al. | 239/227 |
| 4,860,422 | 8/1989 | Marino | 29/402.18 |
| 4,964,731 | 10/1990 | Virtanen | 366/11 |
| 5,158,614 | 10/1992 | Takeuchi | 118/323 |
| 5,178,329 | 1/1993 | Yang | 239/227 |

FOREIGN PATENT DOCUMENTS 1559072 1/1980 United Kingdom .

*Primary Examiner*—Janyce Bell
*Attorney, Agent, or Firm*—Stanley J. Price, Jr.; John M. Adams

[57] ABSTRACT

Refractory material is applied to the interior surface of a vessel by advancing a boom carriage on a frame positioned externally of the vessel through an opening in the vessel. The boom carriage supports a collapsed telescoping mast and a nozzle boom. The carriage supporting the mast and nozzle boom is advanced through the opening to an elevated position within the vessel. At the end of travel of the boom carriage, the telescoping mast is pivoted through approximately 90° to a vertical position and the nozzle boom is pivoted to a position perpendicular to the mast. The mast is progressively extended as the nozzle boom is rotated and refractory material is sprayed from a nozzle assembly on the end of the boom onto the vessel interior surface. The nozzle boom is transversely and pivotally movable on the mast to adjust the position of the nozzle assembly to follow the irregular contour on the interior surface as the mast is telescopically advanced or retracted.

8 Claims, 11 Drawing Sheets

METHOD AND APPARATUS FOR REPAIRING THE REFRACTORY LINING OF A REFRACTORY VESSEL

BACKGROUND OF THE INVENTION

1. Field of the Invention

This invention relates to a method and apparatus for repairing the refractory lining of a refractory vessel and, more particularly, to gunning apparatus maneuverable in large and irregularly shaped refractory vessels for positioning a nozzle assembly closely adjacent to the refractory lining at all locations within the refractory vessel, particularly those locations which are conventionally difficult to spray.

2. Description of the Prior Art

The refractory vessels used in the iron and steel industry for making, carrying, holding and pouring of molten metal, such as blast furnaces, metallurgical ladles, soaking pits, cupolas and the like are exposed to evaluated temperatures over a long period of time of use. This results in deterioration of the interior refractory surface. Consequently, the surface must be either periodically replaced or repaired.

The interior surface of a refractory vessel is repaired first by removing as much of the scale and loose debris from the surface of the vessel before the vessel is relined so that the material spray will securely adhere to the interior surface. Conventional, pressurized air and water are utilized to remove the scale from the wall of the vessel and prepare it for spray relining.

U.S. Pat. Nos. 1,928,621; 3,902,670 and 4,181,258 are examples of well known apparatus for cleaning the surface of refractory vessels. A high pressure spray from a rotatable nozzle utilizes a variety of materials for dislodging loose material from the surface of the vessel. A combination of a stream of water, air, sand or other operating medium are utilized. The medium is directed over the interior surface of the vessel to dislodge the loose material and thereafter air may be blown over the surface to dry it in preparation for the refractory relining operation.

Conventionally, the refractory relining operation requires equipment separate from the equipment used to clean the interior walls of the vessel. Consequentially, the cleaning equipment and the means for mounting it in the vessel must be removed and the refractory spray equipment installed in its place. Cleaning and repairing the vessel for relining followed by relining the vessel are very cumbersome and time consuming operations. One set of equipment must be installed and thereafter removed to permit the installation of another set of equipment.

The conventionally known gunning apparatus for relining a refractory vessel includes a spray unit, such as a nozzle assembly, that is supported for rectilinear and rotational movement within the vessel. The unit is typically supported on a movable carriage either on an overhead gantry or beam within or above the vessel or on a transport car movable on rails or ground below the vessel. Exemplary gunite devices supported overhead and lowered into the vessel, such as a blast furnace or ladle, are disclosed in U.S. Pat. Nos. 3,797,745; 3,799,445; 4,099,708; 4,163,546; 4,167,246; 4,211,367; 4,421,275; 4,860,422; and 5,178,329. Each of these devices includes a rotatable nozzle where the dry refractory and water are mixed at or adjacent to the nozzle outlet for spraying onto the refractory surface.

To accommodate the transport of dry refractory and water to the nozzle outlet, a swivel mechanism is required for the rotatable connection of either a water line or the refractory line to the rotatable nozzle. The separate delivery of the dry refractory and water to the nozzle requires a complex arrangement for supporting and moving the nozzle assembly both vertically and rotatably. Consequentially, for irregularly configured vessels such as a blast furnace, where the interior diameter of the vessel varies along the length from top to bottom, it is difficult to closely position the nozzle relative to the surface. The nozzle must be positioned a distance from the wall so that when the refractory material is sprayed it adheres and is not deflected from the surface.

In other applications, the refractory material and water is mixed from a source outside of the vessel, such as at a swivel point supported on a gantry above the vessel. Examples of this type of arrangement for mixing the refractory material and water delivered through a conduit into the vessel where the conduit is supported for rectilinear and rotational movement relative to the interior wall are disclosed in U.S. Pat. Nos. 3,351,289; 4,301,998; 4,337,897; and 4,494,737.

It is also known to support a gunite device on a transport car movable on rails or on a mobile vehicle positioned below the refractory vessel. The spray nozzle is moved vertically, downwardly or upwardly, to a desired position oppositely the vessel wall. The nozzle is then rotated to apply the mixed refractory and water onto the surface. Examples of this arrangement are disclosed in U.S. Pat. Nos. 3,957,203; 4,085,894; 4,779,798.

One limitation of known gunite devices is the inability to position the spray nozzle at difficult positions to reach within the vessel. This is encountered in vessels having irregular shapes, such as blast furnaces and ladles where the interior circumference and diameter of the vessel varies along the length and depth of the vessel. In order to overcome these problems, gunite devices have been developed for remote control of a spray nozzle for positioning at desired locations within the vessel. Devices of this type are disclosed in U.S. Pat. Nos. 3,973,730; 4,251,063; 4,690,327 and 5,158,614.

While some prior art devices are effective for relining irregularly shaped vessels, they require complex support apparatus that is limited to vessels of a particular configuration. In other words, the gunite device can not be used at one sight for repairing a blast furnace and then transported to another sight for repairing a ladle or the like without making substantial modifications to the support apparatus.

Therefore, there is need for gunite apparatus that is universally adaptable to apply refractory material to the interior surface of a vessel at any point within the vessel regardless the interior configuration of the vessel. The unit must be efficiently moved into and out of position without requiring support mechanisms that must be erected specifically for the interior configuration of the vessel. The spray nozzle must compactly transported to the sight and moved into position for custom spraying. It would also be beneficial if the gunite apparatus could be used to remove scale and loose debris from the vessel wall prior to relining.

SUMMARY OF THE INVENTION

In accordance with the present invention there is provided a gunning apparatus for repairing a refractory lining of a refractory vessel that includes a telescoping mast. Carriage means positions the telescoping mast at a preselected location within the vessel. The telescoping mast is pivotally mounted on the carriage means for movement between a vertical position and a horizontal position. A boom member is mounted on the telescoping mast. Means is provided for moving the beam member linear and arcuate paths relative to the telescoping mast. A spray nozzle is positioned on the boom member. Means is provided for supplying a mixture of refractory material and water to the nozzle for spraying onto the lining of the vessel. Further, means is provided for retracting the telescoping mast from an extended position to withdraw the boom member to a position adjacent to the carriage means where the telescoping mast and the boom member are pivoted to a horizontal position opposite the carriage means.

Further, in accordance with the present invention, there is provided a method for spraying a refractory product upon the interior surface of a refractory body that includes the steps of positioning a telescoping mast within the refractory body for pivotal movement between horizontal and vertical positions. A boom is connected to the telescoping mast for independent pivotal and rectilinear movement relative to the telescoping mast. A spray nozzle is positioned on the boom. The spray nozzle is supplied with a mixture of refractory material and water from a source. The mixture is sprayed from the nozzle upon the interior surface of the refractory body. After spraying, the telescoping mast is then retracted to a collapsed position. The retracted telescoping mast is pivoted from a vertical to a horizontal position. The boom is then pivoted relative to the telescoping mast to position the boom co-extensive with the telescoping mast.

Accordingly, a principal object of the present invention is to provide a gunning apparatus for spraying a refractory product upon the interior surface of a refractory vessel by a nozzle assembly that is supported for movement within the vessel for uniformally applying refractory product at any location within the interior of the vessel.

Another object of the present invention is to provide method and apparatus for supporting a refractory relining nozzle assembly that is efficiently installed, moved, and disassembled in the relining operation.

Another object of the present invention is to provide a gunite device that is assembled in a compact configuration for positioning in a refractory vessel and moved to any location within the vessel for positioning a nozzle assembly opposite the surface of the vessel to be relined.

An additional object of the present invention is to provide a remote control gunite device that is movable along a preselected path within a refractory vessel to maintain a preselected distance of the nozzle outlet from the surface of the vessel so that the refractory material is applied and adhered to the wall without rebounding from the surface.

A further object of the present invention is to provide a gunite device that performs the operations of preparing the interior surface of a refractory vessel for relining and spraying refractory material to reline the interior surface of the vessel without being removed from the vessel in the performance of both operations.

These and other objects of the present invention will be more completely disclosed and described in the following specification, the accompanying drawings and the appended claims.

DESCRIPTION OF THE PREFERRED EMBODIMENTS

Figure 1:
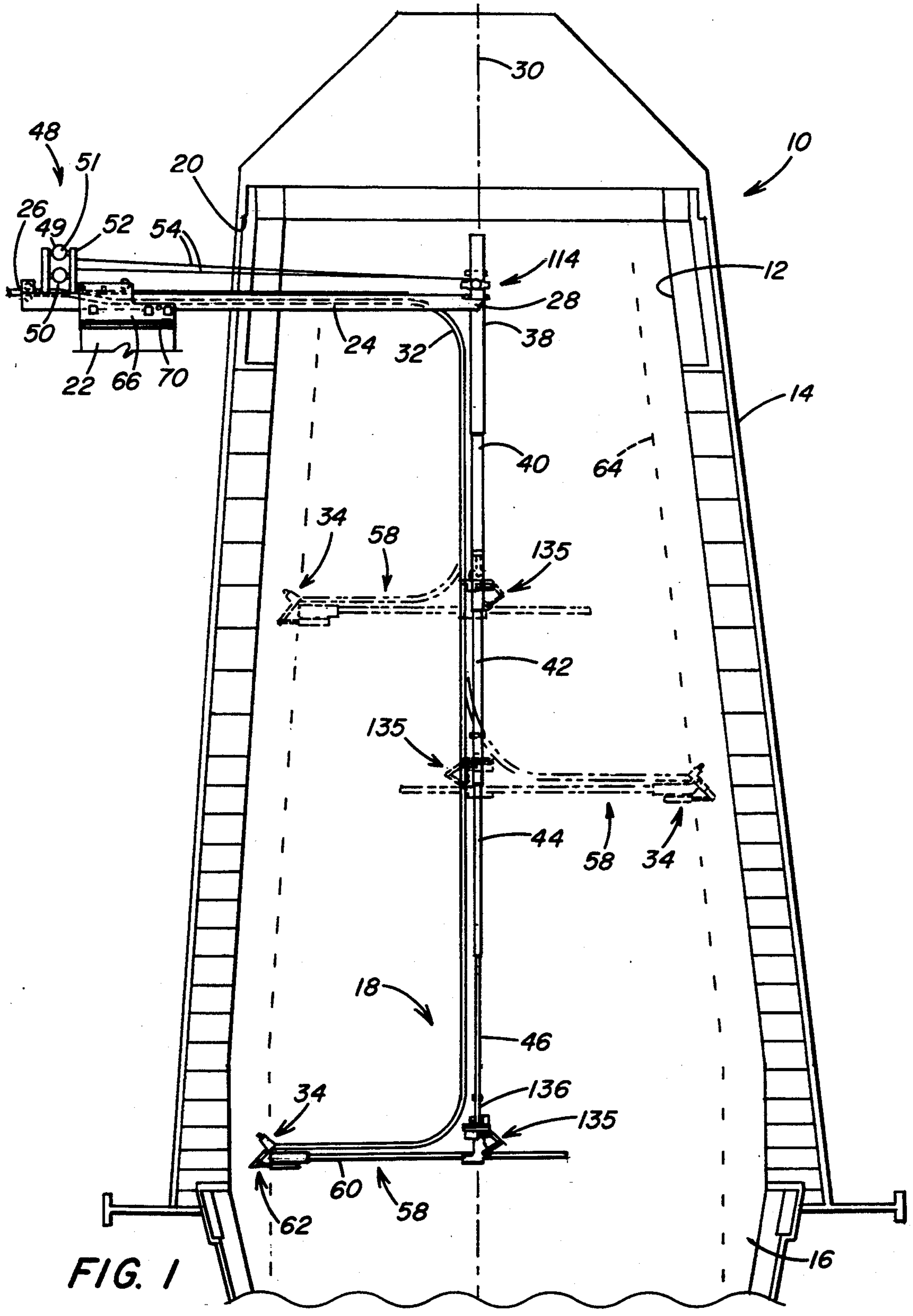
FIG. 1 is a schematic cross sectional view in side elevation of a blast furnace, illustrating a gunite apparatus for relining the interior wall by movement of a nozzle assembly to any desired location in the vessel.
Figure 2:
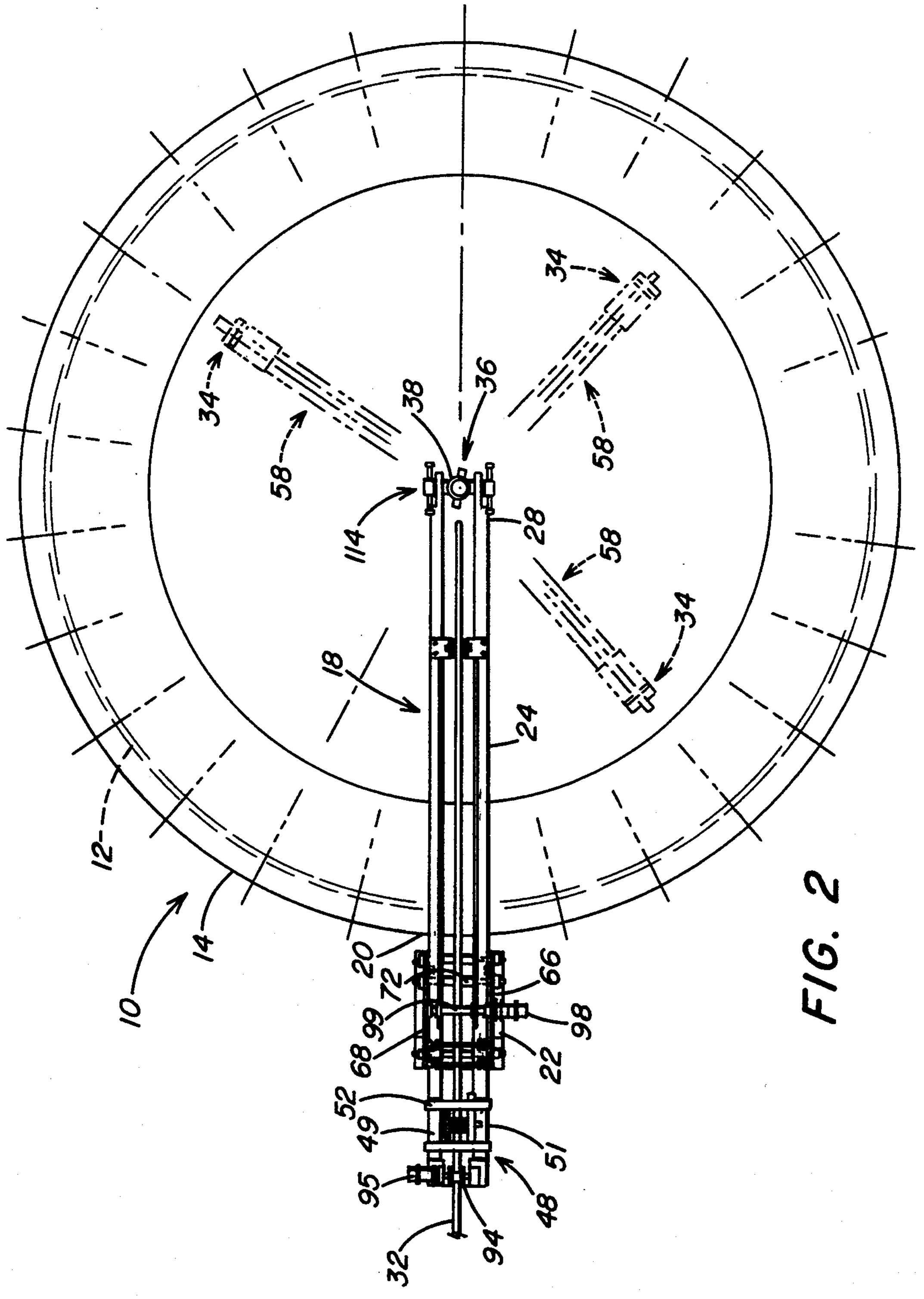
FIG. 2 is a plan view of the blast furnace shown in FIG. 1, illustrating the cantilevered positioning of the nozzle assembly on a telescoping mast positioned for pivotal and rectilinear movement within the blast furnace.

Referring to the drawings and particularly to FIGS. 1 and 2, there is illustrated a blast furnace generally designated by the numeral 10 having an interior wall 12 lined with refractory brick and an exterior metal housing 14. The blast furnace 10 has a stack configuration in which the upper portion of the blast furnace receives the burden that is preheated and reduced. A lower portion 16 of the blast furnace 10 is where the molten metal collects and is removed from the hearth and transferred to ladles (not shown).

The interior refractory lining 12 is subject to temperatures in excess of 1,000° C. and over a period of time deteriorates and must be periodically repaired without shutting the blast furnace down for long periods of time which would decrease the productivity of the blast furnace. Therefore, in accordance with the present invention a refractory gunning apparatus generally designated by the numeral 18 in FIGS. 1 and 2 is positioned within the blast furnace to permit remote control repair and relining without requiring the blast furnace to be shut down for manual repair.

The refractory gunning apparatus 18 is introduced through a hole or opening 20 in the upper end portion of the furnace 10. The apparatus 18 is supported by a stationary frame 22 positioned on structure (not shown) provided externally of the blast furnace 10. The frame 22 supports a boom carriage 24 for horizontal rectilinear movement through the opening 20 to a selected position within the upper portion of the blast furnace 10. The boom carriage 24 includes a first end portion 26 that extends out of the blast furnace and a second end portion 28 that extends into the blast furnace 10. For example as shown in FIG. 1, the boom carriage end portion 28 extends to the vertical center line 30 of the blast furnace 10.

The boom carriage 24 supports a hose 32 which extends the length of the carriage 24 and downwardly therefrom to a nozzle assembly 34 generally designated by the numeral 34. The hose 32 is connected to a source of a mixture of particulate refractory material and water which is supplied in a slurry form from externally of the blast furnace 10 through the hose 32 to the nozzle assembly 34. Movement of the nozzle assembly 34 to a preselected position and along a preselected path with respect to the refractory lining 12 is controlled by the hydraulic and pneumatic devices diagrammatically illustrated in FIG. 20.

The hose 32 extends the length of the boom carriage 24 to a telescoping mast generally designated by the numeral 36. The hose 32 extends the length of the telescoping mast 36 to the nozzle assembly 34. The telescoping mast 36 is pivotally connected to the end portion 28 of the boom carriage 24. As will be explained later in greater detail, the telescoping mast 36 is pivotal, as shown in FIGS. 15–19, from a vertical position on the blast furnace center line 30 to a horizontal position overlying and coextensive with the boom carriage 24.

The telescoping mast 36 is fabricated of a plurality of round tubes telescopically connected in end to end relation. The fully extended position of the telescoping mast 36 is shown in FIG. 1. The mast 36 is formed of a plurality of tubular sections 38, 40, 42, 44 and 46. Section 40 is retractable within section 38, section 42 is retractable in section 40, section 44 is retractable in section 42, and section 46 is retractable in section 44. The fully retracted position of the mast 36 on the end of the boom carriage 24 is shown in FIG. 16.

Figure 9:
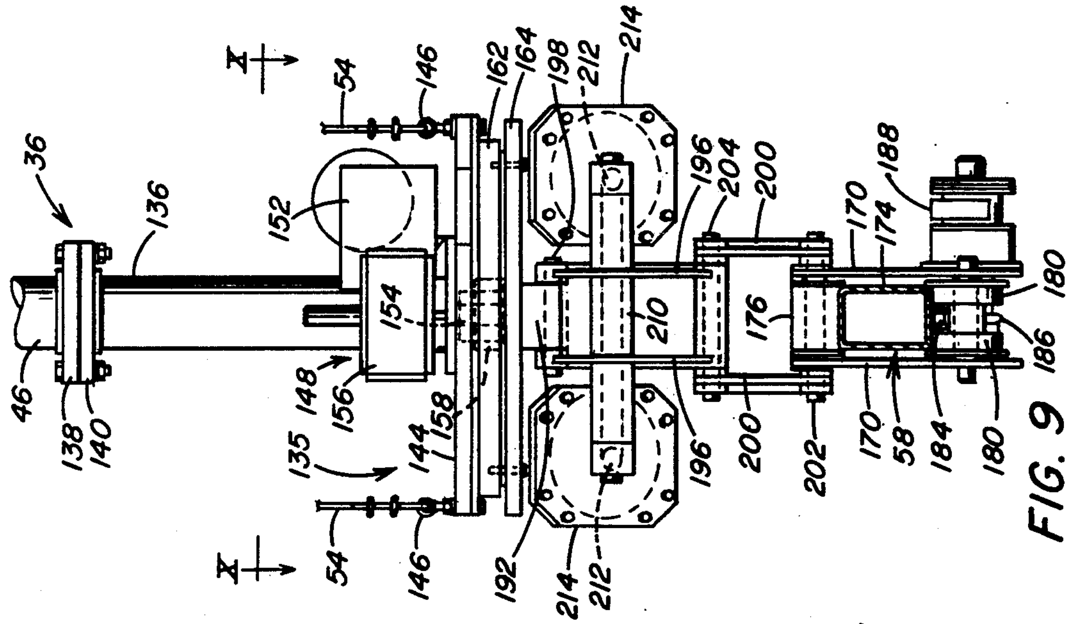
FIG. 9 is a fragmentary end view of the nozzle boom taken along line IX—IX in FIG. 8, illustrating the rotational and pivotal connection of the nozzle boom to the end of the telescoping mast.
Figure 8:
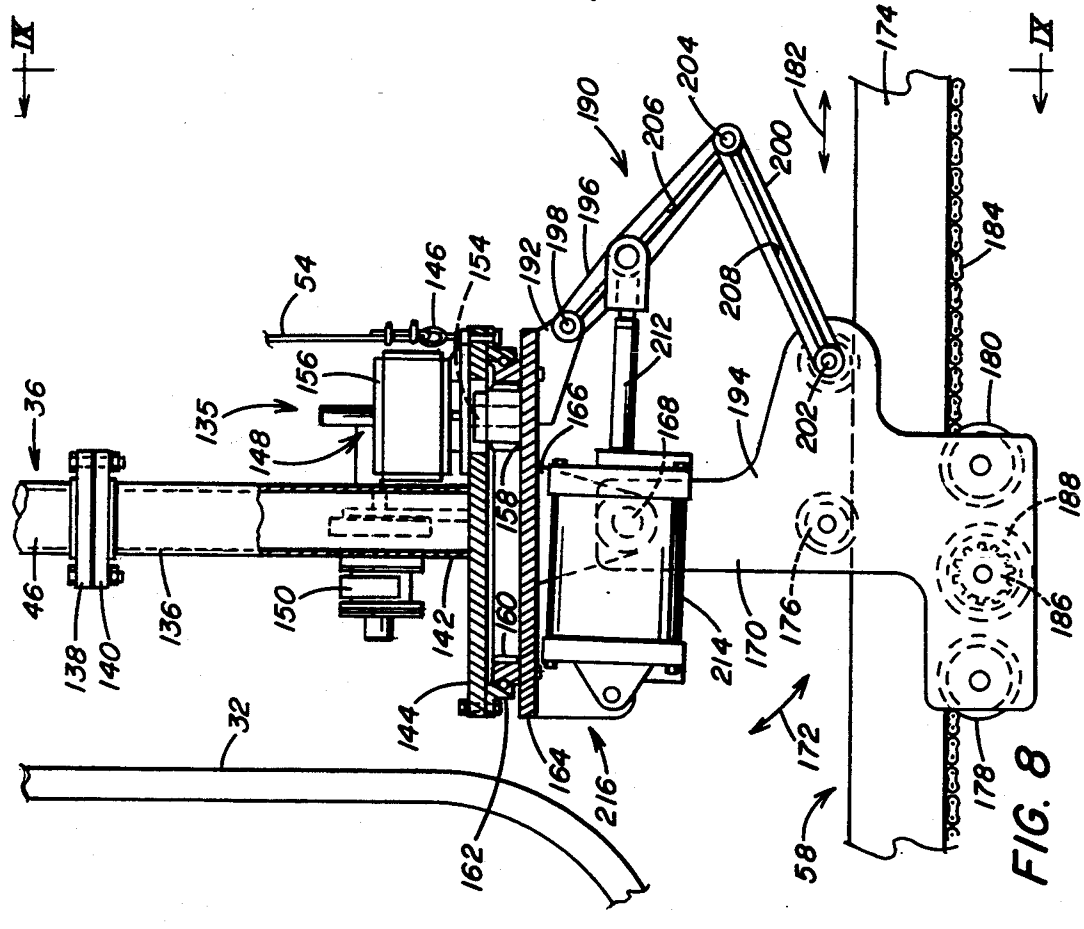
FIG. 8 is an enlarged fragmentary, partial sectional view of the connection of the nozzle boom to the end of the telescoping mast for rotational and linear movement of the nozzle boom.

The extension and retraction of the various sections of the mast 36 is controlled by a mast lift mechanism generally designated by the numeral 48. The mast lift mechanism 48 is supported on the end of the boom carriage 24 externally of the blast furnace 10, as shown in FIG. 1. The lift mechanism 48 includes a pair of hydraulic hoists 49 and 50 each including a reel 51. The reels 51 are rotatably mounted in stacked relationship on a frame 52 positioned on the boom carriage 24. Each reel 51 stores a length of wire rope 54 having one end portion attached to the reel 51 and an opposite end portion connected to the support for the lower end of the mast 36, as shown in FIGS. 8 and 9. Each reel 51 is reversibly driven by a motor 56, such as a hydraulic motor, supported by the frame 52.

Figure 16:
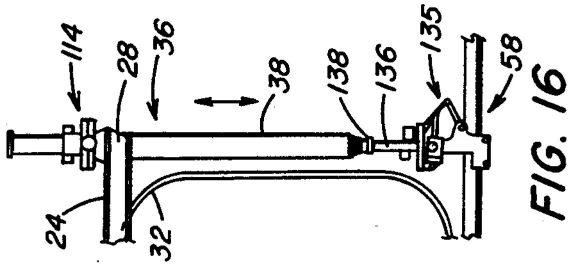

With one end of each wire rope 54 attached to the base of the lowermost mast tubular section 46, as shown in FIG. 9, the mast 36 is retracted from its fully extended position shown in FIG. 1 to its fully retracted position shown in FIG. 16. The mast 36 is retracted by actuating the motors 56 to rotate the reels 51 in a direction to wind the wire ropes 54 onto the reels 51.

As the wire ropes 54 are wound upon the reels 51, the individual mast tubular sections are retracted one within the other. First, the tubular section 46 is withdrawn into the section 44. As the lengths of the wire ropes 54 are shortened, the tubular section 46 is pulled upwardly by the shortened wire ropes 54 so that each section is retracted into the section above it. Section 44 is retracted into section 42, and the retracted sections 42 and 44 are retracted into section 40. Then retracted sections 40, 42, 44 and 46 are retracted into section 38 to the position shown in FIG. 16. The manner in which the individual tubular sections 38–46 are telescopically connected to one another is conventional and will not be described in detail herein.

As shown in FIG. 1, the tubular section 46 at the lowermost end of the telescoping mast 36 is connected to a nozzle boom generally designated by the numeral 58. The nozzle boom 58 is connected to the mast tubular section 46 in a manner to permit a combination of pivotal movement of the boom 58 in a vertical plane, rotational movement of the boom 58 in a horizontal plane, and rectilinear traversing movement relative to the telescoping mast 36.

The hose 32 for conveying the mixture of refractory material and water extends the length of the telescoping mast 36 to the nozzle boom 58 where it bends to a horizontal position, as shown in FIG. 1, and extends the length of nozzle boom 58 to an end portion 60 of the boom 58. The nozzle assembly 34 is connected to the end 60 of nozzle boom 58 by a nozzle tilt and clamp assembly generally designated by the numeral 62 in FIGS. 12–14. As will be described later in greater detail, the nozzle tilt and clamp assembly 62 supports the nozzle assembly 34 for upward and downward pivotal movement on the end of the nozzle boom 58. With this arrangement, the nozzle assembly 34 is precisely located for spraying refractory material on the interior lining 12 of the refractory vessel 10.

Extension and retraction of the telescoping mast 36 positions the nozzle boom 58 and nozzle assembly 34 at a preselected elevation within the blast furnace 10. The relative movement of the nozzle boom 58 with respect to the telescoping mast 36 permits the nozzle assembly 34 to be positioned a preselected distance from the refractory lining 12 and follow the contour of the interior lining 12. This permits the nozzle assembly 34 to be located in the desired position for spraying the refractory lining. In addition, the nozzle assembly 34 also moves along a path which follows the interior contour of the blast furnace 10 regardless of variations in the contour along the length and width of the furnace 10.

As seen in FIG. 1, the interior contour of the blast furnace 10 increases in diameter from the top to the bottom. Then at a preselected height above the bottom of the blast furnace, the interior diameter remains constant. With the present invention, the nozzle assembly 34 is maintained along a preselected path as indicated by the dashed line 64 in FIG. 1.

As further seen in FIG. 1, the nozzle assembly 34 is moved along the line 64 which is maintained a preselected distance from the interior surface 12 along the entire length of the vessel. This precise positioning is maintained for the vessel in which the diameter varies substantially along the length of the vessel. Thus, by supporting the nozzle assembly 34 on the boom 58 which moves transversely as the mast 36 moves upwardly and downwardly, the nozzle assembly 34 follows the path 64 to assure that the spray of refractory material adheres to the lining 12 and is not deflected therefrom because it is cast too far from the lining 12.

BOOM CARRIAGE DRIVE ASSEMBLY

Figure 5:
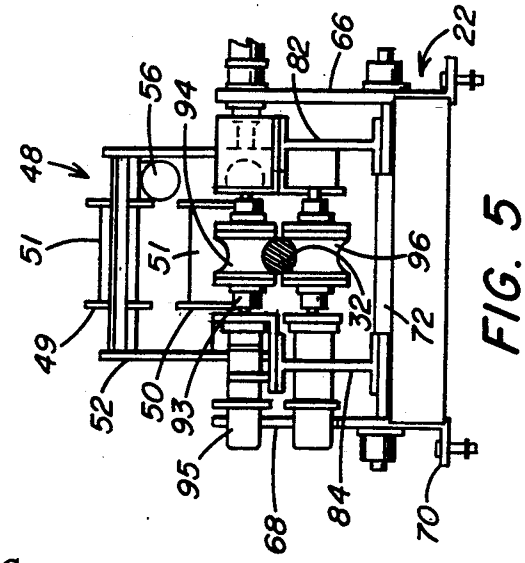
FIG. 5 is an end view of the boom carriage taken along line V—V in FIG. 4, illustrating the telescoping mast supported by rollers on the boom carriage and a pinch roll assembly for feeding the refractory material supply line the length of the boom.
Figure 4:
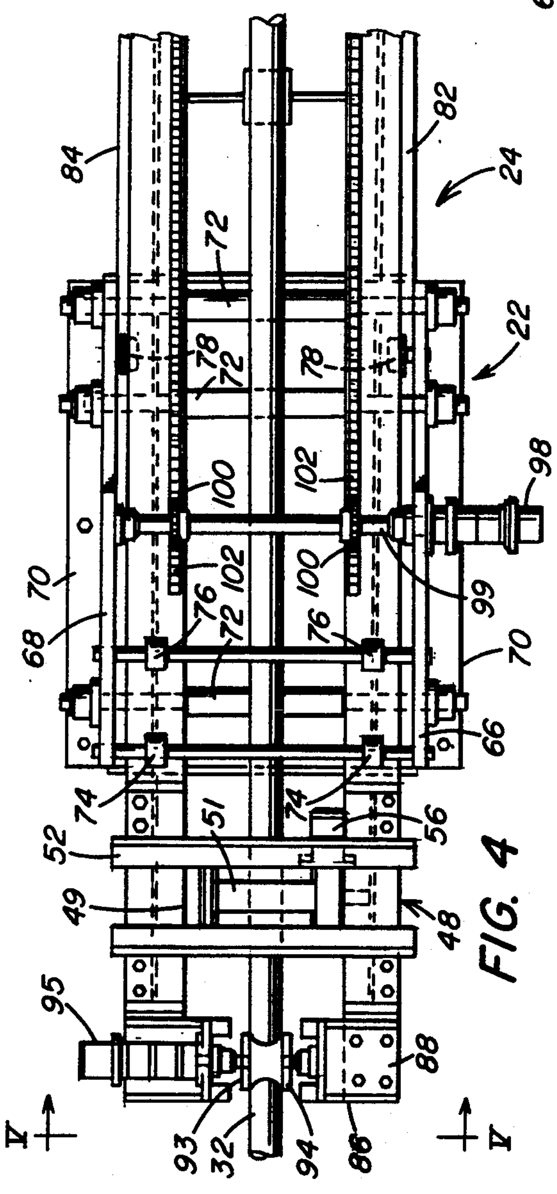
FIG. 4 is a top plan view of the boom carriage shown in FIG. 3.
Figure 3:
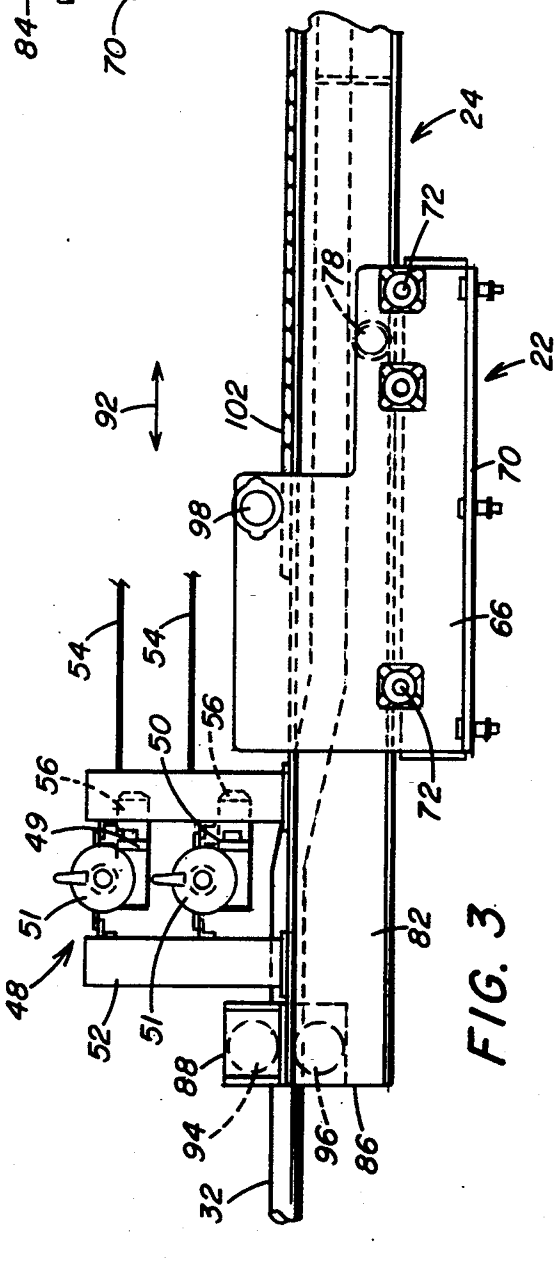
FIG. 3 is an enlarged fragmentary view in side elevation of a boom carriage for supporting the telescoping mast for horizontal movement to a preselected position within the vessel.

Now referring to FIGS. 3–4 there is illustrated in detail the arrangement for traversing the boom carriage 24 through the furnace opening 20 to a preselected position for locating the telescoping mast 36 within the furnace 10. The boom carriage 24 is positioned on a stationary frame 22, shown in FIG. 1, which includes a pair of vertical plates 66 and 68 which are welded to a plate 70 that is bolted to the stationary frame 22 positioned externally of the furnace 10 adjacent to the opening 20. The plates 66 and 68 are maintained a preselected distance apart by rollers 72. As seen in FIGS. 3–5, pairs of rollers 74 and 76 are mounted on the upper ends of plates 66 and 68 respectively and a pair of rollers 78 and 80 are mounted on the lower ends of plates 66 and 68.

Supported by the rollers 72–80 are a pair of I-beams 82 and 84 that are spaced a preselected distance apart and in spaced parallel relation at end portions 86 by transverse plate 88 bolted to the beams 82 and 84. With this arrangement, the connected I-beams 82 and 84 form the boom carriage 24 having a box-like structure. The lower flanges of the I-beams 82 and 84 are positioned on the rollers 72. The rollers 74, 76, 78 and 80 engage the I-beam flanges to facilitate linear travel of the boom carriage 24 in the direction indicated by the arrow 92 in FIG. 3. The stationary frame 22 maintains the boom carriage 24 positioned substantially in a horizontal plane as the carriage 24 is advanced into the interior of the blast furnace 10.

As seen in FIGS. 4 and 5, the hose 32 for conveying a mixture of refractory material and water extends through the interior of the box like structure formed by the boom carriage 24. The hose 32 is connected at one end (not shown) to a point where dry refractory material is conveyed under pressure for mixing with water. The pressurized flow of refractory material and water form a slurry which flows under pressure through the hose 32 to the nozzle assembly 34.

The hose 32 is feed along a path centered within the interior of the boom carriage 24 by a pair of pinch rollers 94 and 96. The rollers 94 and 96 are rotatably mounted on the respective I-beams 82 and 84 and are spaced a preselected distance apart so that concave surfaces of the rollers, as seen in FIG. 5, form a circular opening having a diameter corresponding to the diameter of the hose 32. The pinch roller 94 is drivingly connected by a drive shaft 93 to a hydraulic motor 95. The motor 95 is operable to rotate the pinch roller 94 clockwise or counter clockwise to maintain a preselected tension on the hose 32 as the hose 32 is feed with retraction and extension of the mast 36.

The boom carriage 24 travels on the stationary frame 22 in the direction indicated by the arrow 92 in FIG. 3 by operation of a hydraulic motor generally designated by the numeral 98 mounted on the plate 66. The motor 98 includes a drive shaft 99 drivingly connected to a pair of sprockets 100. The drive shaft 99 extends between the plates 66 and 68 above the upper flanges of the I-beams 82 and 84. The sprockets 100 are retained on the drive shaft 99 in position overlying the I-beam upper flanges.

Chains diagrammatically illustrated by the numerals 102 in FIG. 3 are secured to and extend the length of the upper flanges of I-beams 82 and 84. The driven sprockets 100 engage the chains 102 so that rotation of the sprockets 100 in a preselected direction transmits linear motion to the boom carriage 24 on the stationary frame 22.

The boom carriage 24 is advanced through the opening 20 in the blast furnace 10 to position carriage end portion 28 at a preselected location within the interior of the blast furnace 10. For example, as shown in FIG. 1 the boom carriage 24 is advanced to position the carriage end portion 28 on the vertical center line 30 of the blast furnace 10.

MAST TILT DRIVE ASSEMBLY

Figure 7:
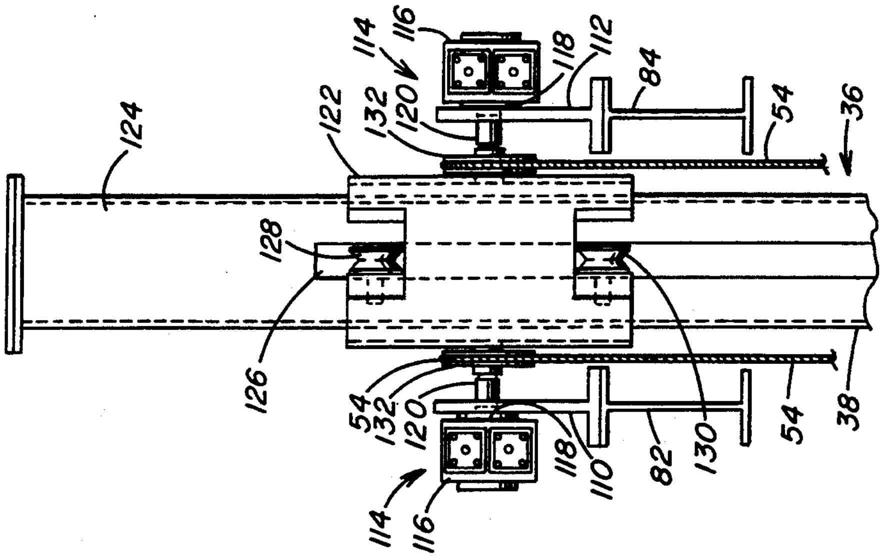
FIG. 7 is a fragmentary end view of the boom carriage taken along line VII—VII in FIG. 6, illustrating the telescoping mast positioned for pivotal movement through an angle of 90° on the end of the boom carriage.
Figure 6:
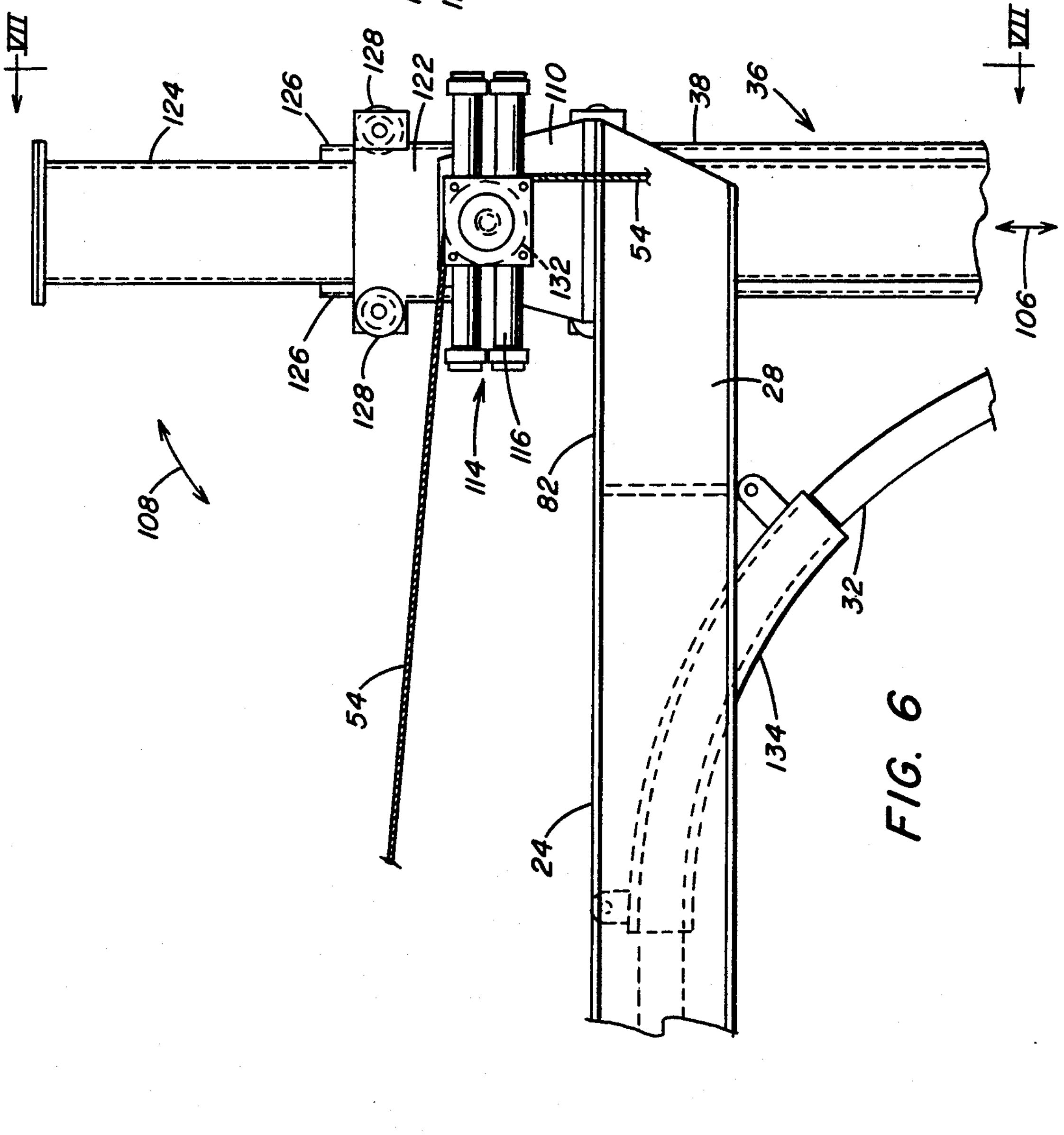
FIG. 6 is an enlarged fragmentary view in side elevation of the pivotal connection of the telescoping mast on the end of the boom carriage and the support of the refractory hose on the boom.

Referring to FIGS. 6 and 7, the telescoping mast 36 is positioned at the end 28 of the boom carriage 24 for vertical linear movement in the direction indicated by the arrow 106 and pivotal movement through an angle of 90° in the direction indicated by the arrow 108. The telescoping mast 36 is mounted on the end 28 of boom carriage 24 by a pair of support plates 110 and 112 which are bolted to the I-beams 82 and 84, respectively.

The pivotal connection of the mast 36 to the boom carriage end portion 28 is accomplished by a conventional hydraulically actuated rack and pinion mechanism generally designated by the numeral 114 in FIGS. 6 and 7. The mechanism 114 includes a hydraulically movable rack positioned in housing 116 connected to the support plates 110 and 112 for linear movement in a horizontal plane. A pinion gear 118 engages each rack so that upon translation of the rack 116 by the hydraulic actuator in a preselected direction, the gear 118 is rotated in a preselected direction. Each pinion 118 is nonrotatably connected to a shaft 120 that extends from opposite sides of a tubular sleeve 122. Thus, when the pinion 118 is rotated in a counterclockwise direction, the sleeve 122 pivots 90° from a vertical position as illustrated in FIGS. 6 and 7 to a horizontal position in the direction indicated by the arrow 108.

The sleeve 122 surrounds an upper end portion 124 of section 38 of the telescoping mast 36. The mast upper end portion 124 is stabilized within the sleeve 122 by the provision of a pair of vertical guides 126 that are secured to opposite sides of the mast upper end portion 124. The guides 126 extend a preselected the length on the mast upper end portion 124. The guides 126 have a V-shaped configuration in section. A pair of upper guide rollers 128 and a pair of lower guide rollers 130 engage the vertical guides 126 which are welded to opposite sides of the mast upper end portion 124 to maintain vertical movement of the telescoping mast 36 in the mast sleeve 122.

Also associated with the mast sleeve 122 is a pair of pulleys 132 which are rotatably mounted on the shafts 120 to support the wire ropes 54 feed from the reels 51. The pulleys 132 direct the wire ropes 54 from above the boom carriage 24 downwardly on opposite sides of the mast 36 as shown in FIG. 7. Also, the refractory hose 32 extends to the end 28 of the boom carriage 24 in overlying relation with a flexible saddle support 134. The support 134 is mounted on the I-beams 82 and 84 and has an arcuate configuration to direct the hose 32 in an arcuate path downwardly to a position along side the telescoping mast 36.

As seen in FIG. 1, the refractory hose 32 extends the length of the mast 36. At the bottom of the mast 36, the hose 32 follows another arcuate path to extend along the length of the nozzle boom 58 to its connection with the nozzle assembly 34.

NOZZLE BOOM ROTATE DRIVE ASSEMBLY

As discussed above, the telescoping mast 36 is formed of a plurality of round tubes 38–46, one telescopically positioned within another where the uppermost tubular section 38 is pivotally mounted by the sleeve 122 to the end portion 28 of the boom carriage 24. The lowermost tubular section 46 is connected by a nozzle boom rotate drive assembly generally designated by the numeral 135 in FIGS. 8–10 to the nozzle boom 58.

Connected to the end of the lowermost mast tubular section 46 is an extension tube 136. As seen in FIG. 8, the connection is completed by a flange 138 on the tubular section 46 bolted to a flange 140 on the extension tube 136. With this arrangement, when the mast 36 is fully retracted as seen in FIG. 16, all the mast sections are withdrawn into the upper mast section 38 with the extension tube 136 extending from the collapsed mast 36.

The extension tube 136 extends, for example, about 4½ feet from its connection to the tubular section 46 to a lower end portion 142 which is secured, such as by welding, to a horizontal plate 144 that is part of the nozzle boom rotate drive assembly 135. The ends of the wire ropes 54 that control the raising and lowering of the mast 36 are connected by eye-bolts 146 to the plate 144. With this arrangement, upon actuation of the mast lift mechanism 48 the reels 51 are rotated in a preselected direction, for example in a counterclockwise direction, to wind the wire ropes 54 onto the reels 51. As the wire ropes 54 are wound onto the reels 51, the horizontal plate 144 together with the assembly 135 and the nozzle boom 58 is raised vertically.

The tubular sections of the mast 36 are progressively collapsed one within the other as the wire rope strands 54 pull the plate 144 upwardly. The lowermost tubular section 46 is first advanced into the tubular section 44 thereabove. When the flange 138 is positioned oppositely of the end of the tubular section 44, the tubular sections 44 and 46 are advanced upwardly into the section 42. When the flange 138 is positioned oppositely the lower end of the section 42, the sections 44 and 46 are withdrawn into section 42. Continued raising of the wire ropes 54 draws all of the collapsed sections 40–46 into the uppermost section 38 until the flange 138 is positioned oppositely the lower end of tubular section 38, as illustrated in FIG. 16.

Figure 10:
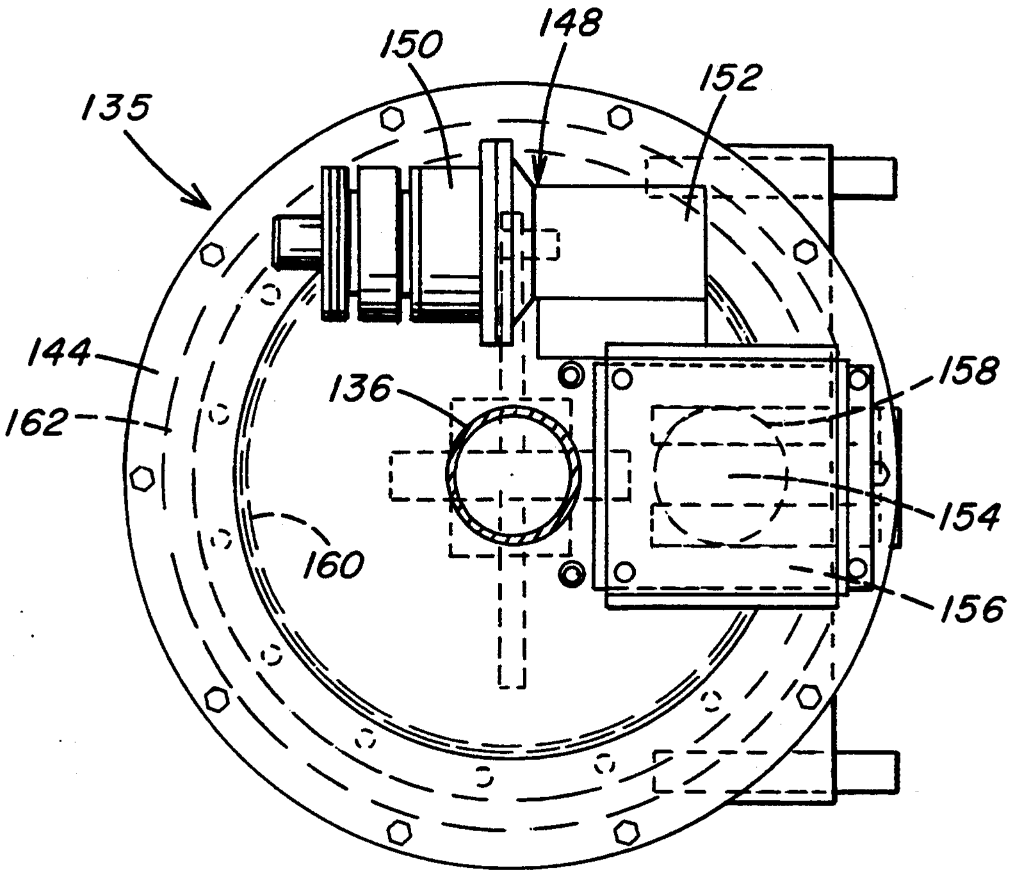
FIG. 10 is a plan view partially in section of the rotational connection of the telescoping mast to the nozzle boom taken along line X—X in FIG. 9, illustrating the drive mechanism for rotating the nozzle boom.

As seen in detail in FIGS. 8–10, a pneumatic motor generally designated by the numeral 148 is mounted on the plate 144. The motor 148 is conventional in design and includes an output shaft rotatably supported within a motor housing 150 and drivingly connected through a gear reducer 152 to an output shaft 154. The output shaft 154 is positioned within a gear housing 156. Non-rotatably connected to the output shaft 154 within the gear housing 156 is a spur gear 158. The spur gear 158 meshes with a surrounding ring gear 160. The ring gear 160 is rotatably supported by bearing 162. The outer race of the bearing 162 is bolted to the horizontal plate 144, as illustrated in FIG. 8. The inner race of the bearing 162 is bolted to a lower horizontal plate 164. With this arrangement, rotation generated by the pneumatic motor 148 is transmitted through the meshing gears 158 and 160 to rotate the plate 164 continuously through 360° rotation.

NOZZLE BOOM TILT AND TRAVERSE DRIVE ASSEMBLY

As seen in FIG. 8, extending downwardly and centrally from the rotatable horizontal plate 164 is a bracket 166 that carries a horizontal pivot pin 168. Mounted on the pivot pin 168 are a pair of tilt arms 170 which support the nozzle boom 58 for upper and downward tilting movement in the direction indicated by arrow 172 about the horizontal.

Extending between the tilt arms 170 at the lower end portions thereof is the nozzle boom 58 formed by a square tubular member 174 that is supported for linear movement on the tilt arms 170 by rollers 176, 178 and 180 which are rotatably mounted to extend between the tilt arms 170 as seen in FIG. 9. With this arrangement, the nozzle boom 58 is supported for translational rectilinear movement on the tilt arms 170 in the direction indicated by arrow 182 in FIG. 8. Secured to and extending the length of the square tubular member 174 is a single strand roller chain 184 that is engaged by a sprocket 186 rotatably supported as seen in FIG. 9 between the tilt arms 170. The rollers 178 and 180 are positioned on opposite sides of the sprocket 186. The sprocket 186 is drivingly connected to an output shaft of a motor 188 similar to the motor 98 that rotates the sprocket 100 for translating the boom carriage 24.

Not only is the nozzle boom 58 movable in a linear path in the direction indicated by the arrow 182 in FIG. 8, it also pivots or tilts in the direction indicated by the arrow 172. The pivotal or tilting movement of the nozzle boom 58 is accomplished by connecting a linkage mechanism generally designated by the numeral 190 to the tilt arms 170. The linkage mechanism 190 is connected at an upper edge end portion to a plate 192 that extends downwardly from the rotatable plate 164 and at a lower end portion to a forwardly extending portion 194 of the tilt arms 170.

As seen in detail in FIGS. 8 and 9, the linkage mechanism 190 includes a first pair of link arms 196 connected by pivot pin 198 to the plate arm 192. A lower pair of link arms 200 is connected by a pivot pin 202 to the forwardly extending portion 194 of the tilt arms 170. The adjacent ends of the pairs of link arms 196 and 200 are connected by a pivot pin 204.

As seen in FIG. 8, the pairs of link arms 196 and 200 are provided with longitudinal slots 206 and 208 respectively. The longitudinal slots 206 in the pair of link arms 196 receive a slide arm 210, as seen in FIG. 9, that is connected at its end portions to the ends of piston rods 212 of piston cylinder assemblies 214. The piston cylinder assemblies 214 are in turn pivotally mounted by a clevis connection generally designated by the numeral 216 extending from the lower surface of the rotatable horizontal plate 164. With this arrangement, extension and retraction of the piston rods 212 upon actuation of the piston cylinder assemblies 214 pivots the link arms 196 and 200 relative to one another so that the tilt arms 170 pivot on the pin 168 in the direction indicated by arrow 172.

As the link arms 196 and 200 pivot the slide arm 210 moves along the length of the longitudinal slots 206 so that the tilt arms 170 are raised and lowered or tilted in the direction indicated by the arrow 172. Accordingly, tilting of the arms 170 carries with it in a corresponding motion the nozzle boom 58 and the nozzle assembly 34 mounted on the end thereof. This action is schematically illustrated in FIG. 11 which also illustrates the relative vertical movement of the telescoping mast 36 for positioning the nozzle boom 58 and nozzle assembly 34 at a preselected elevation within the refractory vessel.

Figure 11:
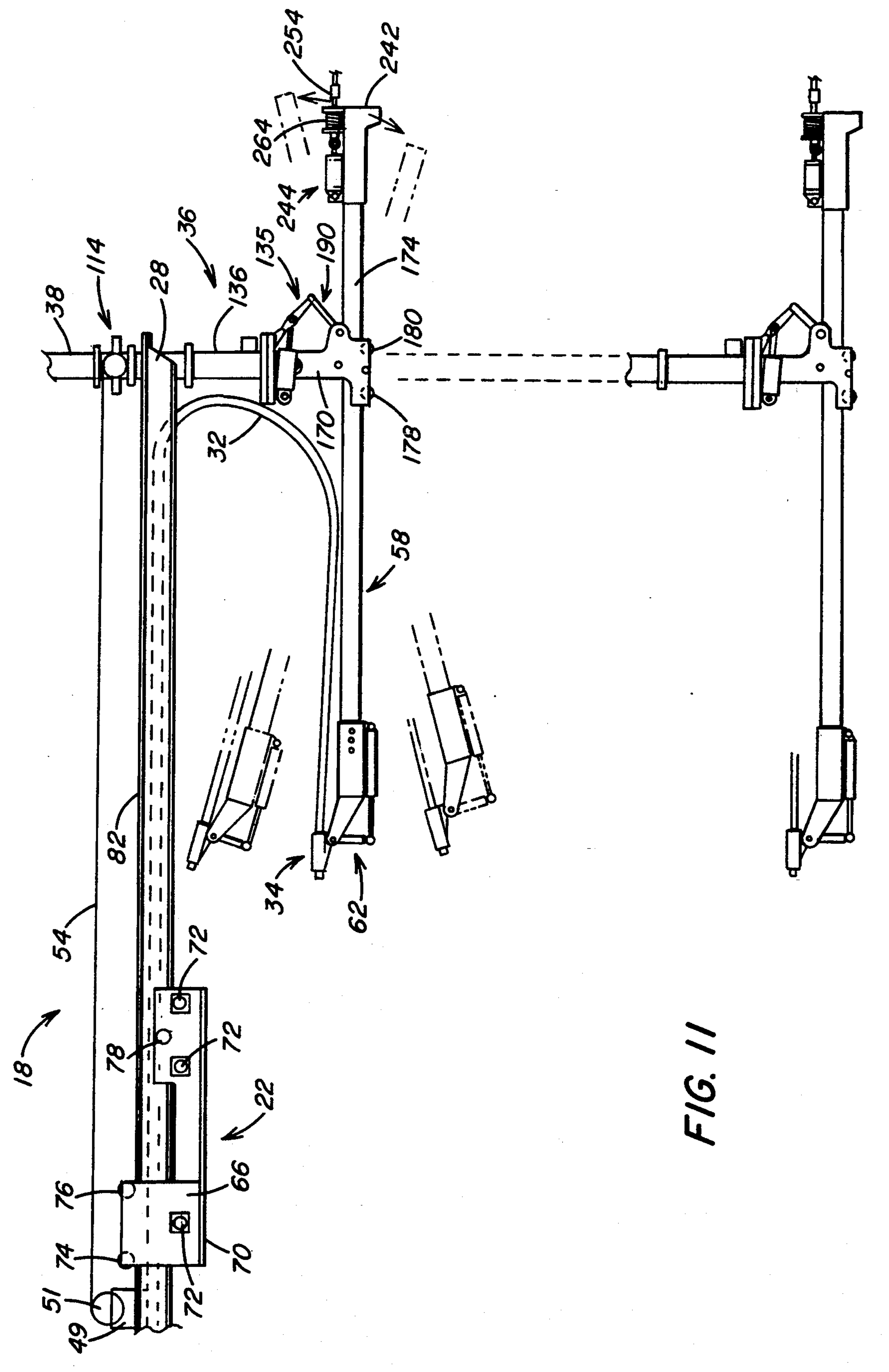
FIG. 11 is a schematic elevational view of the nozzle boom, illustrating the relative positioning of the nozzle boom on the telescoping mast.

As schematically illustrated in FIG. 11, the boom 58 and nozzle assembly 34 are pivotal in a vertical plane. The boom 58 is also translatable linearly to move the nozzle assembly 34 a preselected distance from the surface of the vessel. In this manner, as the mast 36 is raised and lowered during the relining operation, the nozzle assembly 34 is maintained a desired distance from the wall of the refractory vessel. Thus, the nozzle 34 follows the interior contour of the vessel. This assures that the nozzle assembly 34 is maintained at the desired position for spraying so that the refractory spray substantially adheres to the vessel wall and is not deflected from the wall as would be the case if the spray were cast too far from the surface of the vessel wall.

NOZZLE TILT AND CLAMP ASSEMBLY

Figure 14:
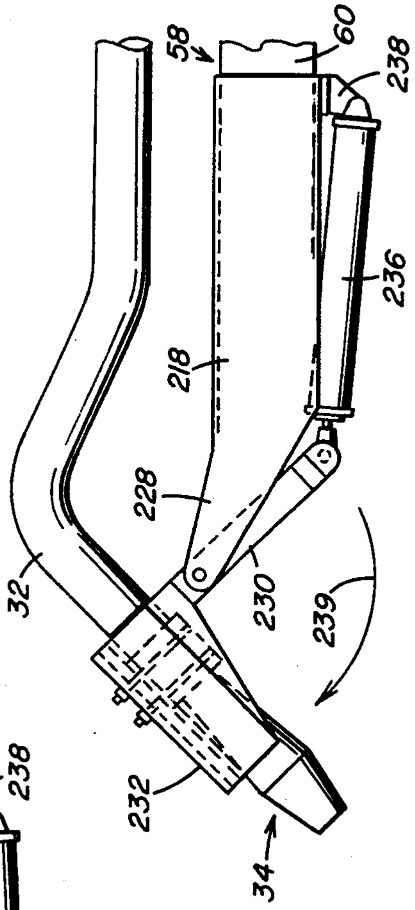
FIG. 14 is a view similar to FIG. 13, illustrating the nozzle pivoted to a downward position on the end of the boom.
Figure 12:
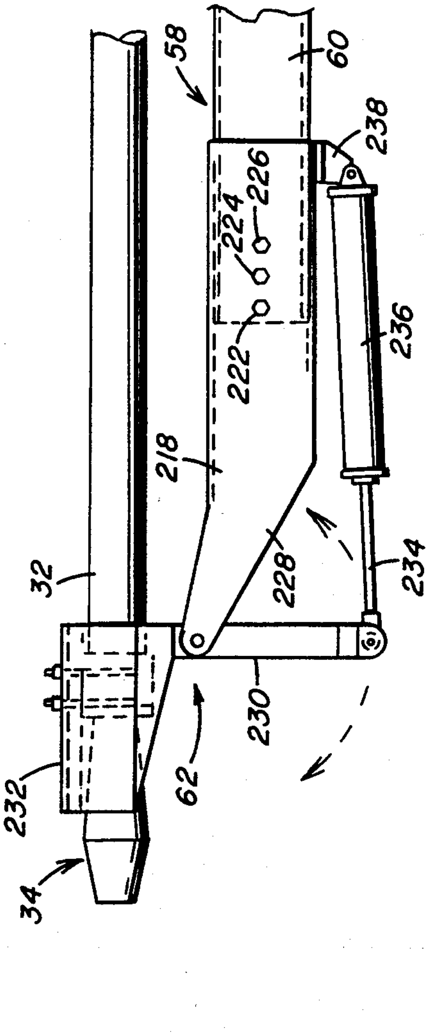
FIG. 12 is an enlarged, fragmentary schematic view in side elevation of the end of the nozzle boom, illustrating the pivotal connection of the nozzle to the boom.
Figure 13:
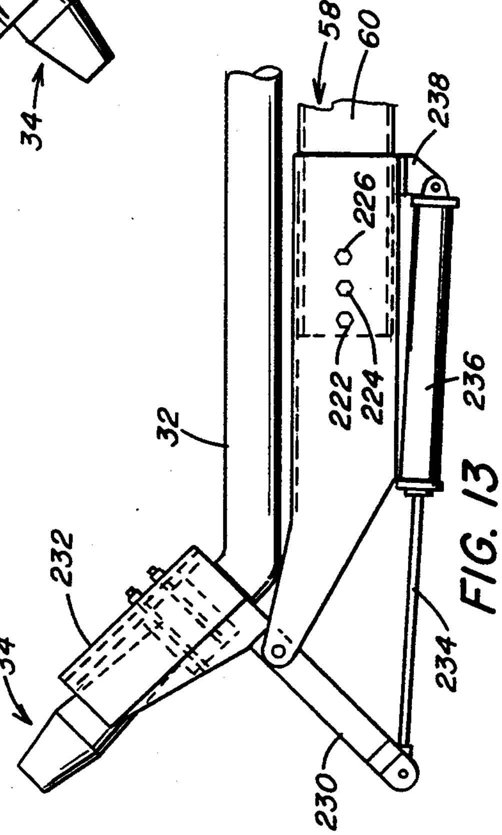
FIG. 13 is a view similar to FIG. 12, illustrating the nozzle pivoted to an upward position on the end of the boom.

Now referring to FIGS. 12–14, there is illustrated the arrangement for pivoting or tilting the nozzle assembly 34 relative to the end of the nozzle boom 58 by pivotally mounting the nozzle assembly 34 connected to the hose 32 on the end of the nozzle boom 58. In one embodiment, this is accomplished by attaching to the end 60 of the nozzle boom 58 a tilt arm 218 having a tubular configuration that slides onto the end of the boom 58 having a similar cross sectional configuration. The tilt arm 218 is adjustably connected to the end of the boom 58 by bolts 222, 224 and 226 extending through in the tilt arm 218 and into corresponding holes in the end of the boom 58. The tilt arm 218 includes at its opposite end portion an upwardly extending portion 228 which is pivotally connected to a lower arm 230 of a mounting bracket 232 for the nozzle assembly 34.

As seen in FIGS. 12–14, the mounting bracket 232 is bolted to the nozzle assembly 34 where the mounting bracket 232 surrounds the nozzle assembly 34. The lower end of the arm 230 is connected to an extensible piston rod 234 of a piston cylinder assembly 236. The assembly 236 is pivotally mounted at its end portion to a bracket 238 that is rigidly secured to the lower surface of the tilt arm 218.

Actuation of the piston cylinder assembly 236 extends the piston rod 234 to pivot the bracket 232 on the end of the arm 218 to in turn pivot the nozzle assembly 34 through a pivotal arc in the direction of arrow 239 seen in FIG. 14. For example, the nozzle assembly 34 is pivotal on the end of the nozzle boom 58 through at least an angle of 45 °. This provides an additional range of pivotal movement for the nozzle assembly 34 when combined with the tilting or pivotal movement of the nozzle boom 58 on the tilt arms 170.

As seen in FIG. 12, the nozzle assembly 34 is pivoted to a position extending parallel to the nozzle boom 58. From the position shown in FIG. 12, the nozzle assembly 34 is pivoted upwardly and downwardly. This increases the capability of selectively positioning the nozzle assembly 34 with respect to a point or area on the vessel wall. This range of movement permits vertical spraying of the refractory material with the nozzle boom 58 remaining stationary. This allows selective repair of a section of the vessel or, if needed, concentrating an increased amount of refractory material at a point where the lining has deteriorated to an extent greater than the remaining area of the lining.

TELESCOPING MAST RETRACTION

Figure 15:
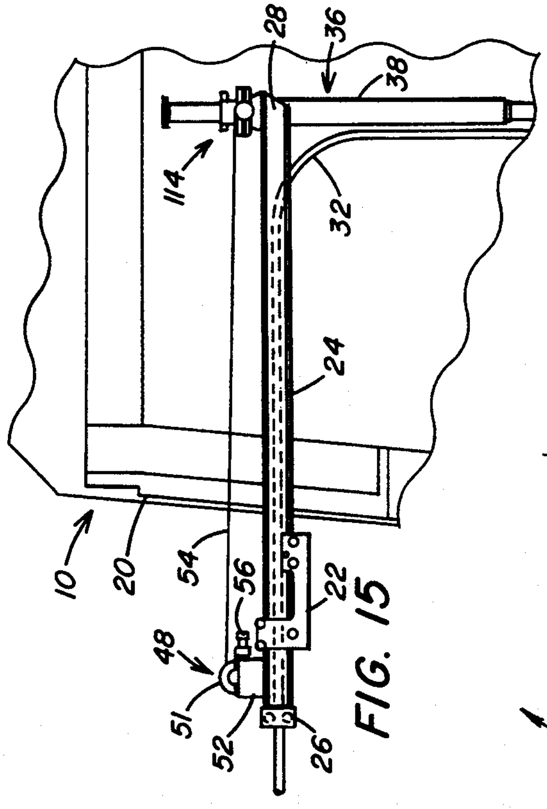

Once the relining operation is completed, the telescoping mast 36 and the boom carriage 24 are retracted, as illustrated in FIGS. 15–19, to a compact position for retrieval from the interior of the vessel. As seen in FIG. 15, the telescoping mast 36 is extended to its desired operational length within the vessel. Thereafter as described above, the individual tubular sections of the mast 36 are progressively withdrawn one within the other by reeling in the wire ropes 54 on reels 51. The wire ropes 54 are reeled onto the rolls 51 until all of the tubular sections 40–46 are positioned within the uppermost tubular section 38, as shown in FIG. 16. This also brings the nozzle boom 58 to a position closely adjacent to the end of the upper tubular section 38.

Figure 17:
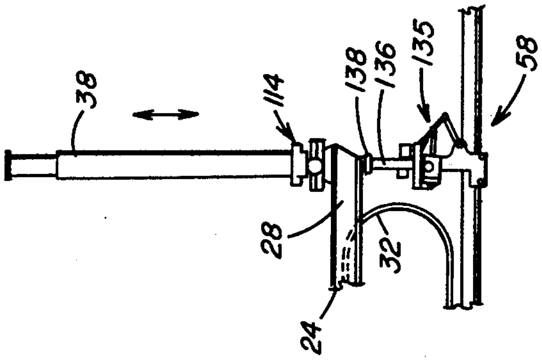
FIGS. 15, 16, 17, 18 and 19 are fragmentary schematic illustrations of the relative movement of the telescoping mast and nozzle boom to retract and position the telescoping mast and nozzle boom on the boom carriage.
Figure 18:
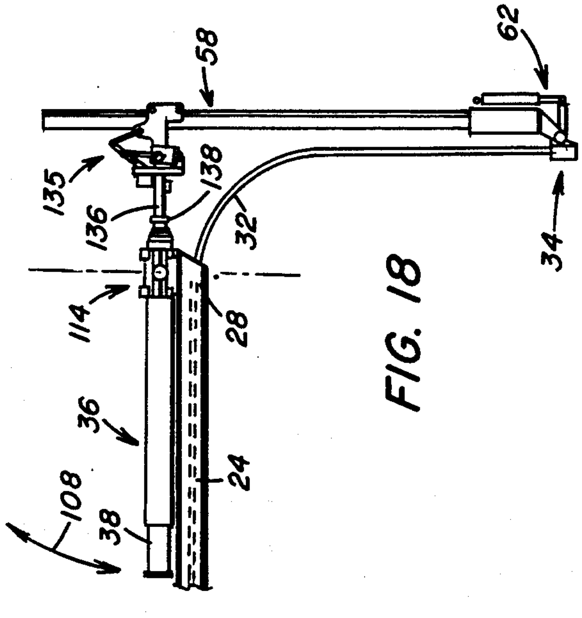

When the collapsed telescoping mast 36 and nozzle boom 58 are raised to a position adjacent to the boom carriage 24 as shown in FIG. 17, the mast upper tubular section 38 is positioned above the boom carriage 24 by continued reeling of the wire ropes 54. When the nozzle boom 58 has been raised to the position where the flange 138 on the end of the extension tube 136 is closely adjacent to the end 28 of boom carriage 24, the retracted mast 36 is then pivoted through an angle of 90° from a vertical position to a substantially horizontal position, as seen in FIG. 18. By operation of the rack and pinion connection 114 of the mast 36 to the end of the carriage 24 the mast 36 is pivoted into overlying relation with the boom carriage 24. Thereafter, the nozzle boom 58 is pivoted from the horizontal position shown in FIG. 17 to the vertical position shown in FIG. 18.

Figure 19:
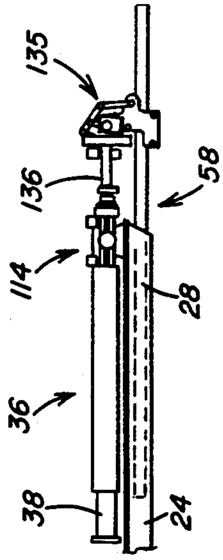

Once the collapsed mast 36 is positioned overlying the boom carriage 24 as shown in FIG. 18, the nozzle boom 58 is then pivoted 90° about its connection to the assembly 135 from a vertical position to a horizontal position shown in FIG. 19. The boom 58 is moved within the cavity formed by the I-beams 82 and 84 of the carriage 24. In this manner, the nozzle boom 58 is retracted into the boom carriage 24. In this position, the boom carriage 24 and the nozzle boom 58 are ready to be moved out of the vessel through the opening 20 in the blast furnace 10.

OPERATOR CONTROL APPARATUS

The positioning of the mast 36, as described above and illustrated in FIGS. 15–19, and application of the refractory lining material to the interior wall of the vessel is controlled by an operator positioned outside of the vessel 10, preferably closely adjacent to the opening 20 in the vessel as shown in FIG. 1. The controls for performing these operations are schematically illustrated in a hydraulic and pneumatic circuit generally by the numeral 290 in FIG. 20.

The circuit 290 includes a first operational segment 292 for control of the position of the mast 36 in the vessel and a second operational segment 294 for control of the application of the lining material. Each segment 292 and 294 is controlled by manual operation of individual hydraulic and pneumatic valves with cross control thereof for safety purposes.

Figure 20:
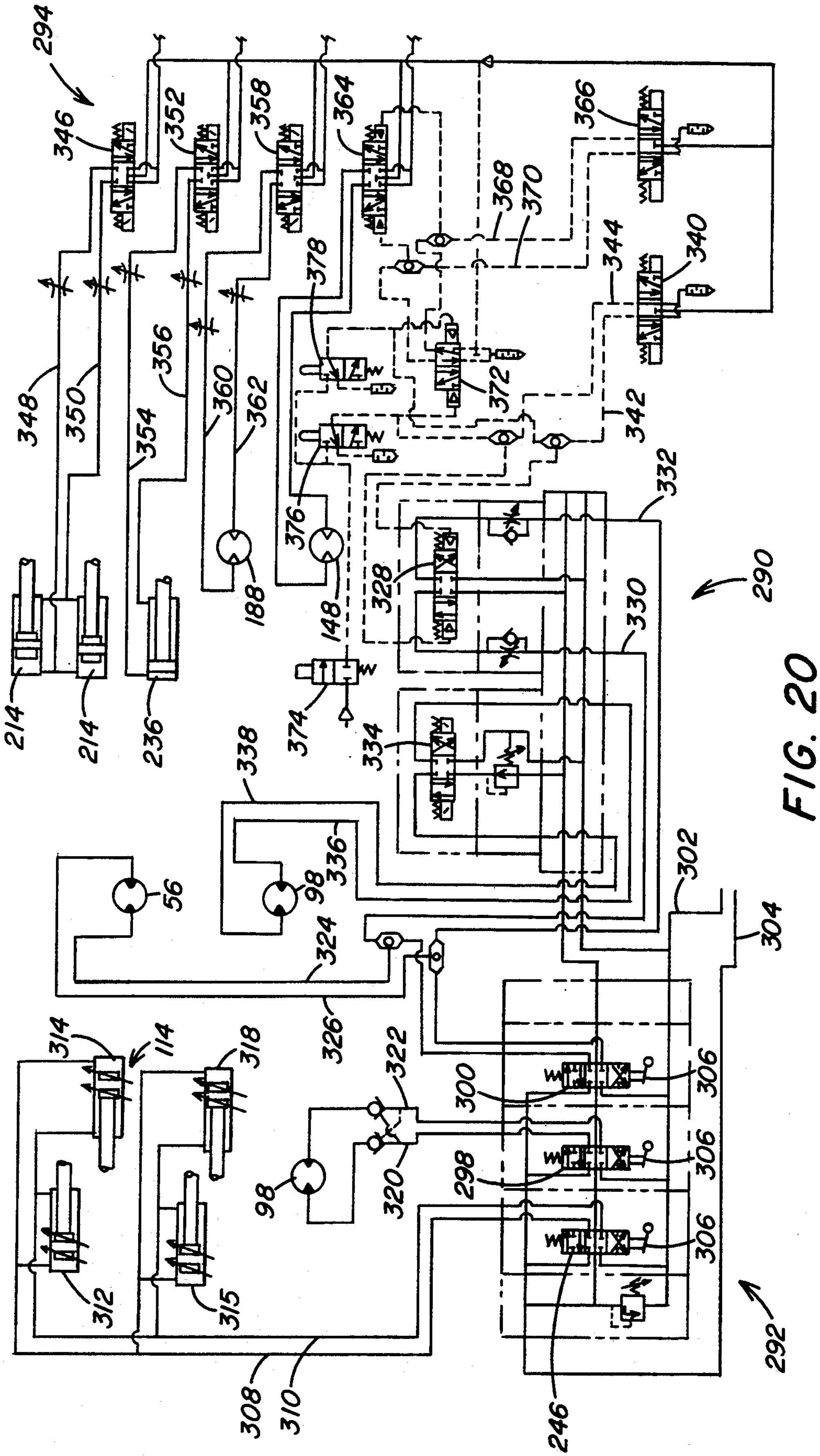
FIG. 20 is a diagrammatic illustration of the control system for operating the gunning apparatus in accordance with the present invention.

The segment 292 for mast control includes conventional, manually operated solenoid valves 296, 298 and 300. Each valve is connected by conduits 302 and 304 to tank and pressure of a pressurized hydraulic source (not shown). Each valve includes a lever 306 for three-way positioning of the valve for directional control of fluid under pressure to and from the various hydraulically operated devices. The valves 296, 298 and 300 are spring biased in a normally closed position as illustrated in FIG. 20. Movement of the levers 306 actuates the valves.

The valve 296 is connected by conduits 308 and 310 to pairs of piston cylinder assemblies 312, 314 and 316, 318 that control the hydraulically actuated rack and pinion mechanism 114. Movement of the lever 306 to a first position against the bias of the spring pressurizes one end of each assembly 312, 314 and 316, 318 to tilt the mast 36 up to a vertical position on the carriage boom 24. Movement of the lever 306 to a second position pressurizes the opposite end of each assembly 312, 314 and 316, 318 to tilt the mast 36 down to a horizontal position on the carriage boom 24.

Movement of the boom carriage 24 on the stationary frame 22 into position within the vessel 10 is controlled by operation of the manually operated solenoid valve 298 corresponding in construction to valve 296. Valve 298 is connected by conduits 320 and 322 to the hydraulic motor 98 which generates movement of the carriage boom 24 via the chain drive on the stationary frame 22. By controlling the direction of flow of pressurized fluid to the motor 98 by selective positioning of lever 306 on valve 298, the carriage boom 24 is moved toward away from the opening 20 in the vessel 10. The motor 98 is selectively operated to position the end 28 of the boom 24 at a desired location for the mast 36 in the vessel 10.

In a similar arrangement, the manual valve 300 is connected by conduits 324 and 326 to the hydraulic motor 56 that operate the wire rope reels 51 for raising and lowering the mast 36 once it is in a vertical position on the end of the boom carriage 24. Thus, the valves 296, 298, and 300 are actuated to position the mast 36 on the boom carriage 24 for lowering in the vessel. These valves are operable in one mode individually to carry out the discrete motions of mast tilt, carriage drive, and manual winch control and in a second mode together in order to overcome any headroom or wall obstructions.

Once the mast 36 is in position on the end of the boom carriage 24, the circuit segment 294 is operated for the application of lining material on the interior surface of the vessel 10. The lining operation is controlled by a plurality of solenoid operated pneumatic and hydraulic valves which are operated at a push button station (not shown) outside of the interior of the vessel. An automatic, pneumatic piloted valve 328 is connected by conduits 330 and 332 to motors 56 for automatic operation of the cable reels 51. An electrically operated solenoid valve 334 is connected by conduits 336 and 338 to motor 98 of the driven pinch roller 94 for hose 32. Automatic actuation of the motor 98 controls the tension in the hose 32 in response to upward and downward movement of the mast 36.

Push button control for raising and lowering the mast 36 to a desired elevation within the vessel is effected by operation of pneumatically operated valve 340 which is interfaced through conduits 342 and 344 which, in turn, are connected to the pilot valve 328 that controls operation of the cable reel motors 56. The valve 340 is preferably operated in a timed sequence for automatic vertical movement (indexing) of the mast 36 followed by rotation of the mast 36. The mast 36 moves vertically or indexes in increments for selective positioning of the nozzle boom 58.

Once the mast 36 has indexed to a preselected position, the automatic operations of translation, rotation, and tilting of the nozzle boom 58 are carried out. Tilting of the boom 58 is controlled by solenoid valve 346 connected by conduits 348 and 350 to the piston cylinder assemblies 214 shown in detail in FIGS. 8 and 9. Tilting of the nozzle assembly 34 on the end of the boom 58 is effected by operation of solenoid valve 352 connected by conduits 354 and 356 to piston cylinder assembly 236, shown in detail in FIGS. 12–14. Translation of the boom 58 is effected by operation of solenoid valve 358 connected by conduits 360 and 362 to motor 188 which operates the chain drive shown in FIGS. 8 and 9 for linearly moving the nozzle boom 58 at the bottom of the mast 36.

Once the nozzle boom 58 is advanced to the desired elevation within the vessel and translated to position the nozzle assembly 34 a preselected distance from the lining 12, the boom 58 is then tilted to a desired angle followed by tilting, if required, of the nozzle assembly 34 on the end of the boom 58. The nozzle boom 58 is then rotated by operation of motor 148 through actuation of interactive solenoid valves 364 and 366 connected to each other through control lines 368 and 370.

The valves 364 and 366 are controlled manually by push button control in one mode or automatically in another mode through control valve 372. Under automatic control by operation of valve 372, the nozzle boom 58 is indexed to desired elevations within the vessel. After each indexing movement, the boom 58 is automatically rotated. The rotational speed of the boom 58 is controlled through suitable controls as a manual function.

The direction of rotation of the nozzle boom 58 is controlled by cam operated limit switches 374, 376 and 378 which actuate the control valve 372. When the boom 58 completes movement through one complete revolution or through a preselected angle less than 360°, the limit switches 374, 376 and 378 are engaged to automatically actuate valves 364 and 366 through valve 372 to reverse the direction of rotation of the nozzle boom 58. In a cycle of operation between vertical indexing of the mast 36, the boom 58 does not rotate in the same direction. The direction of rotation is reversed after each indexing of the mast 36 upon contact of the boom 58 with the limit switches 374, 376 and 378.

For example, in operation after incremental vertical movement of the mast 36, the boom 58 rotates clockwise through one complete revolution during which time the refractory material is sprayed from the nozzle assembly 34. The spraying is interrupted followed by indexing of the boom 58 to the next position where the boom 58 is rotated counterclockwise. The range of rotational movement of the nozzle boom 58 is thus controlled by the limit switches.

The amount of vertical boom index is controlled by pneumatic timers. Also, as the mast 36 is automatically indexed, the tension on the refractory hose 32 is automatically adjusted. With this arrangement, the operator has complete control over the movement of the nozzle assembly 34 from a push button station remote from the interior of the vessel 10.

SCALE REMOVAL APPARATUS

Figure 21:
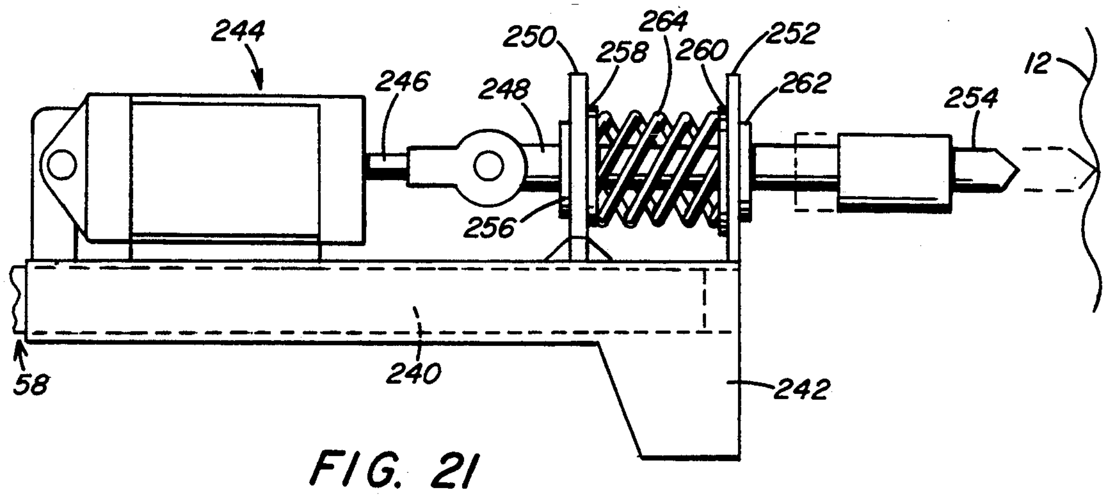
FIG. 21 is an enlarged, fragmentary schematic view in side elevation of the opposite end of the nozzle boom, illustrating an impact device for dislodging loose material from the vessel wall prior to relining.

Further, in accordance with the present invention, not only is the refractory gunning apparatus 18 operable to spray refractory material to reline a metallurgical or refractory lined vessel, it is also operable to prepare the vessel wall for relining by removing loose scale and debris that remains on the surface of the lining. The loose scale and debris must be removed so as to assure that the refractory spray adheres to a secure surface. Referring to FIG. 21, there is schematically illustrated the end of the nozzle boom 58 opposite the end of the boom for the nozzle assembly 34.

Attached to the end 240 of the boom 58 is a support bracket 242. The bracket 242 supports at one end portion a piston cylinder assembly generally designated by the numeral 244 having an extensible piston rod 246 connected to one end of an impact rod 248. The impact rod extends through a pair of vertical plates 250 and 252 and includes at the opposite end a striking end portion 254. The plate 250 is welded to the bracket 242; while, the plate 252 is movable on the upper horizontal surface of the bracket 242.

A recoil pad 256 is positioned around the impact rod 248 on the surface of the plate 250 opposite the piston rod 246. On the opposite side of the plate 250 is positioned a restraining pad 258. Opposite the restraining pad 258 is positioned a restraining pad 260 against one surface of the movable plate 252. On the other side of the movable plate 252 is a guide bushing 262. The impact rod 258 extends from its connection to the end of the piston rod 246 through the recoil pad 256, the plate 250, the restraining pad 258, the restraining pad 260, the vertical plate 252, and the guide bushing 262. In one embodiment, the striking end portion 254 is removably attached to the extreme end of the impact rod 248 to allow for replacement of the striking end portion 254 due to wear.

Surrounding the impact rod 248 between the spaced apart plates 250 and 252 is a compression spring 264. The compression spring 264 abuts at one end portion the pad 258 against the fixed plate 250 and at the opposite end portion the pad 260 positioned against the movable plate 252. As seen in FIG. 21, the piston rod 246 is retracted within the piston cylinder assembly 244. Retraction of the rod 246 retracts the impact rod 248 on the bracket 242. Retracting the impact rod 248 overcomes the force of the spring 264 to compress the spring between the pads 258 and 260. The compression spring 264 is illustrated in its compressed state in FIG. 21.

The piston cylinder assembly 244 is actuated to extend the piston rod 246 through a rapid release valve (not shown) that is well known and not described in detail herein. Upon release of the actuation valve for the piston cylinder assembly 244, the compressive force applied by the retracted piston rod 246 against the spring 264 is released. This permits the compression spring 264 to rapidly extend in length and forwardly advance the movable plate 252 to carry with it the impact rod 248 that is permitted to extend with outward extension of the piston rod 246 from the cylinder 244. Preferably, the length of travel of the extended impact rod 248 by the action of the spring 264 is about 3 inches and is schematically illustrated in FIG. 21.

The length of travel of the impact rod 248 is sufficient to allow the striking end portion 254 to impact the surface of the vessel with sufficient force to dislodge loose scale and other material that remains adhered to the lining, but ordinarily not removable by sand blasting or high pressure water spray or air. The reciprocating travel of the impact rod 248 is accomplished by sequential extension and retraction of the piston rod 246 upon actuation of the piston cylinder assembly 244. This is accomplished by remote control of the cylinder assembly 244.

Figure 22:
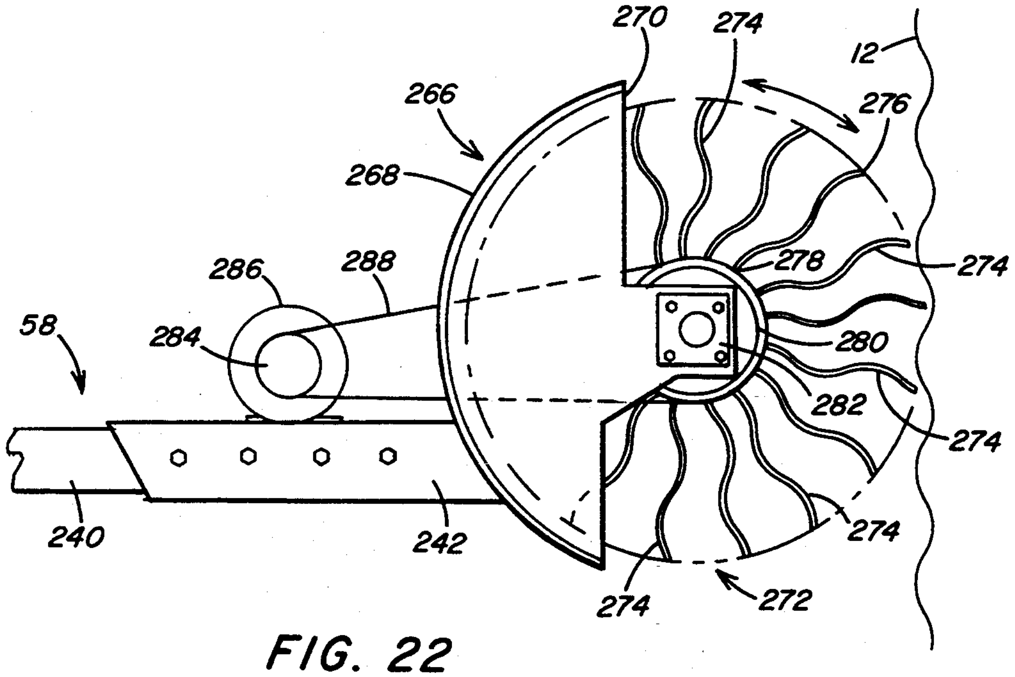
FIG. 22 is a view similar to FIG. 21, illustrating another embodiment of a device for removing scale and debris from the interior wall of vessel prior to relining.

Now referring to FIG. 22, there is illustrated an additional embodiment of an impact tool for scraping loose material from the vessel wall prior to relining. With the embodiment shown in FIG. 22, the bracket 242 is connected to a semicircular cylindrical housing that extends transversely of the nozzle boom 58 a preselected length. The housing 266 has an arcuate wall 268 and an open end portion 270 for receiving a wire rope brush generally designated by the numeral 272.

The wire rope brush 272 is formed by a plurality of rows of wire rope 274 having an outer end portion 276 and an inner end portion 278. The end portions 278 extend through holes (not shown) in a drum 280 and are welded to the drum 280. The drum 280 is rotatably supported at its end portions by pillow blocks 282 which are supported on the lateral end portions of the semicircular housing 266.

The drum 280 includes a sprocket (not shown) that is rotatable therewith. Mounted on the bracket 242 behind the shield wall 268 is a sprocket 284 drivingly connected to a motor 286 supported by the bracket 242. A drive chain 288 drivingly connects the sprocket 284 and the sprocket on the drum 280. Upon actuation of the motor 286, rotation is transmitted from the sprocket 284 to the drum 280 and the wire rope brush 272.

With both embodiments of the scraping device shown in FIGS. 21 and 22, the nozzle boom 58 is translated on the end of the mast 36 to locate the opposite end of the boom 58 where the devices are positioned in close adjacency to the wall of the vessel. In the case of the impact tool 248, the nozzle boom is extended to locate the striking end portion 254 about 3 inches from the surface of the vessel. This is to allow the tool to travel or extend approximately 3 inches to impact the vessel surface.

In case of the wire rope brush 272, the brush is advanced to a position where the brush end portions 276 are in contact with the surface of the vessel. The motor 286 is then actuated to rotate the brush at a preselected speed in a preselected direction to dislodge loose material from the surface of the vessel. In this manner, the vessel surface is prepared for relining preliminary to refractory spray. Accordingly, the operations of preparing the surface and spraying are accomplished by a single device which is efficiently moved within the vessel.

Accordingly to the provisions of the patent statues, I have explained the principle, preferred construction, and mode of operation of my invention and have illustrated and described what I now consider to represent its best embodiments. However, its should be understood that, within the scope of the appended claims, the invention may be practiced otherwise than as specifically illustrated and described.

I claim:

1. A method for spraying a refractory product upon the interior surface of a refractory body comprising the steps of, positioning a telescoping mast within the refractory body for pivotal movement between horizontal and vertical positions, connecting a boom to the telescoping mast for independent pivotal and rectilinear movement relative to the telescoping mast, positioning a spray nozzle on the boom member, supplying the spray nozzle with a mixture of refractory material and water from a source, spraying the mixture from the nozzle upon the interior surface of the refractory body, retracting the telescoping mast to a collapsed position, pivoting the retracted telescoping mast to a horizontal position, and pivoting the boom member relative to the telescoping mast to position the boom coextensive with the telescoping mast.

2. A method as set forth in claim 1 which includes, advancing the telescoping mast in the collapsed position and the coextensive boom member through an opening in the refractory body to a position therein, and independently pivoting both the telescoping mast and boom member to a position for movement of the boom member for spraying refractory material from the nozzle to areas of the interior surface of the refractory body.

3. A method as set forth in claim 1 which includes, supporting the nozzle on the end of the boom member for pivotal movement in a vertical plane, and tilting the boom member on the telescoping mast to adjust the position of the nozzle independently of the pivotal movement of the nozzle on the boom member.

4. A method as set forth in claim 1 which includes, translating the boom member in a linear path at a angle on the telescoping mast to advance the nozzle a distance from the surface for spraying refractory material.

5. A method for relining the interior surface of a refractory vessel comprising the steps of, telescopically positioning a mast within the interior of the refractory vessel to extend between a retracted position and an extended position the length of the vessel, positioning a nozzle assembly on the mast, supplying a mixture of refractory material and water to the nozzle assembly for spray application upon the vessel interior surface, rotating the nozzle assembly about the mast to apply the refractory material uniformly around the interior surface at a elevation within the vessel, telescopically moving the mast within the vessel to sequentially position the nozzle assembly at elevations within the vessel, rotating the nozzle assembly as the nozzle assembly is moved to elevations within the vessel, and moving the nozzle assembly transversely within the vessel to follow the contour of the interior surface and maintain the nozzle assembly a distance from the interior surface as the mast telescopically moves in the vessel.

6. A method as set forth in claim 5 which includes, tilting the nozzle assembly relative to the mast to adjust the angle of spray of the refractory material from the nozzle assembly.

7. A method a set forth in claim 5 which includes, supporting the telescoping mast in a vertical position for lateral movement in the vessel to a position relative to the vertical center line of the vessel.

8. A method as set forth in claim 5 which includes, advancing the telescoping mast in a retracted position horizontally to an elevated position within the vessel, pivoting the retracted mast from a horizontal position to a vertical position within vessel, and progressively telescoping the mast vertically in the vessel to advance the nozzle assembly relative to the vessel interior surface.

* * * * *

UNITED STATES PATENT AND TRADEMARK OFFICE

CERTIFICATE OF CORRECTION

PATENT NO. : 5,419,922

DATED : May 30, 1995

INVENTOR(S) : Robert A. Bajek

It is certified that error appears in the above-indentified patent and that said Letters Patent is hereby corrected as shown below:

column 1, line 21, delete "evaluated" and insert --elevated--;

column 8, line 5, delete "feed" and insert --fed--; and column 8, line 16, delete "feed" and insert --fed--; and In the claims:

claim 4, column 18, line 4, at the end of the line delete "a" and insert --an--.

Signed and Sealed this

Twenty-ninth Day of October 1996

Attest:

Bruce Lehman

BRUCE LEHMAN

*Attesting Officer* *Commissioner of Patents and Trademarks*